United States Patent [19]

Warren

[11] Patent Number: 4,504,869

[45] Date of Patent: Mar. 12, 1985

[54] COLOR MOVIOLA FOR TWO-TRACK VTR

[75] Inventor: Henry R. Warren, Belle Mead, N.J.

[73] Assignee: RCA Corporation, New York, N.Y.

[21] Appl. No.: 420,497

[22] Filed: Sep. 20, 1982

[51] Int. Cl.[3] .............................................. H04N 9/491
[52] U.S. Cl. ................................... 358/312; 360/10.1
[58] Field of Search .............................. 358/312, 330; 360'/10.1

[56] References Cited

U.S. PATENT DOCUMENTS 4,400,741  8/1983  Sekimoto et al. ................... 358/312

Primary Examiner—Richard Murray
Attorney, Agent, or Firm—Eugene M. Whitacre; William H. Meise; Henry I. Steckler

[57] ABSTRACT

When in the high or low speed editing or "moviola" mode, a VTR switches the inputs of Y and C demodulators between the Y and C heads or switches the demodulator outputs as the heads cross tracks. Thus, the Y and C demodulators always receive or provide at least some Y and C signals respectively, thereby making color display during the moviola mode possible.

8 Claims, 3 Drawing Figures

COLOR MOVIOLA FOR TWO-TRACK VTR

BACKGROUND OF THE INVENTION

The present invention relates to helical scan VTRs (video tape recoders), and more particularly, to a system for achieving color "moviola" (playback faster or slower than the recorded speed) with such a VTR.

When editing a recorded video tape, it is customary to run the tape back in either direction at tape speeds other than the recorded speed, while the headwheel rotational speed is generally the same as the rotation speed used during recording in order to provide the same field rate as used in recording, all while viewing the reproduced signal. This is the so-called "moviola mode". When using the moviola mode, each of the playback heads scans across several tracks, thereby reproducing only a segment of any particular prerecorded track.

If the tape was recorded using separate tracks for the luminance (Y) and chroma (C) signals, then in non-moviola mode playback when the playback speed equals the recording speed, two playback heads are used to reproduce said tracks, respectively. However, when in the moviola mode, it is customary to switch the input of a Y signal demodulator between the Y and C playback heads so that as the Y head moves off the Y track and the C head moves onto the Y track, the Y demodulator input is switched from the Y head to the C head. Similarly, as the C head moves off the Y track and the Y head moves back onto the Y track, the Y demodulator input is switched from the C head back to the Y head. Thus a substantially continuous Y signal is present at the input of the Y demodulator. In other words, whichever head is over the Y track provides the Y signal to the Y demodulator. No input signal is provided to the C demodulator.

The result is a monochrome signal present at the output of the Y demodulator, whose quality is sufficient for editing purposes. However, the monochrome signal causes tape editor fatigue.

It is therefore desirable to provide a color signal from a VTR when in the moviola mode to reduce editor fatigue.

SUMMARY OF THE INVENTION

Method and apparatus for reproducing from a multi-track tape having at least a pair of signals recorded at a selected linear tape speed in respective tracks, comprising scanning a pair of transducers across said tape using a linear tape speed different from said selected speed, whereby each of said transducers scans a plurality of said tracks, and switching the ports of a pair of demodulators as said transducers cross said tracks.

DETAILED DESCRIPTION

Figure 1:
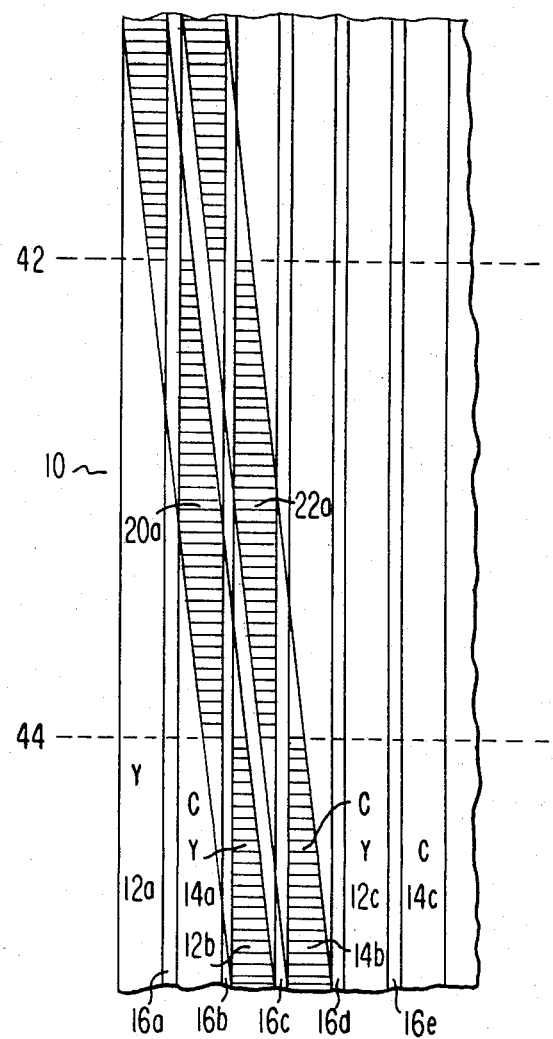
FIG. 1 shows a tape segment when scanned in the moviola mode.

FIG. 1 shows a segment of a prerecorded magnetic recording tape 10. As indicated at the bottom of FIG. 1, tape 10 comprises luminance (Y) tracks 12a, 12b, 12c, etc. that alternate with chroma (C) tracks 14a, 14b, 14c, etc., with guard bands 16a, 16b, 16c, 16d, 16e, etc. disposed between luminance tracks 12 and chroma tracks 14 The Y-tracks 12 contain a carrier FM modulated by the Y signal while C-tracks 14 contain at least a pair of carriers FM modulated by the I and Q signals respectively. When in the moviola mode at twice normal tape speed, a pair of Y and C playback heads 20 and 22 respectively (shown in FIG. 2) are mounted on a headwheel 100 and scan tape 10 as indicated in FIG. 1 by the shaded scan tracks 20a and 22a respectively. It will be noted that each head scans both Y and C tracks 12 and 14.

Figure 2:
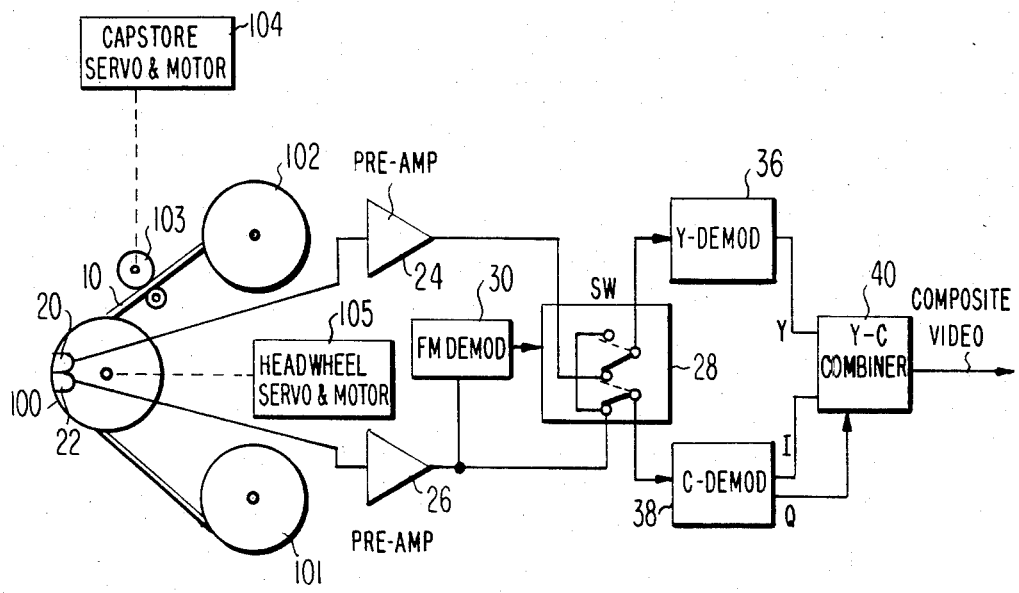
FIG. 2 shows a block diagram of a first embodiment of the invention.

FIG. 2 shows a block diagram of the invention. The tape 10 is transported from supply reel 101 around drum and headwheel 100 to take-up reel 102 by a capstan 103 driven by capstan servo and motor 104. The headwheel is controlled by headwheel servo and motor 105. Although heads 20 and 22 are shown side-by-side in FIG. 2 for purposes of clarity they are actually disposed one atop another. Also, since tape 10 is wrapped about drum or headwheel 100 at a 180 degree angle, another such pair of heads is required spaced 180 degrees from the shown pair along with appropriate head switching circuitry, all as known in the art. The Y and C heads 20 and 22 provide signals to preamplifiers 24 and 26 respectively. The output signals provided from preamplifiers 24 and 26 are coupled to DPDT switch 28, and preamplifier 26 also provides its output signal to identification detector 30. Detector 30 comprises an FM demodulator having a center frequency equal to the undeviated center frequency of one of the chrominance carriers. The output signal from demodulator 30 is coupled to control the position of switch 28. The outputs of switch 28 are respectively coupled to the input ports of Y-demodulator 36 and C-demodulator 38. Y-demodulator 36 comprises an FM demodulator having a center frequency tuned to the undeviated carrier frequency of the Y signal, while C-demodulator 38 comprises a frequency separation filter (not shown) for splitting the chroma signal into its separately modulated I and Q components, and FM demodulators centered at the undeviated carrier frequencies of the I and Q signals respectively. The demodulated signals from the output ports of demodulators 36 and 38 are provided to Y-C combiner 40, which provides a composite video output signal for further processing and eventual display.

In operation, it is initially assumed that as shown at the top of FIG. 1, Y-head 20 is reproducing Y-track 12a, while C-head 22 is reproducing C-track 14a. One of the I and Q carrier signals is demodulated by demodulator 30 and switch 28 is controlled to be in the position shown in solid line in FIG. 2. Thus, the Y signal from head 20 is applied to the input port of Y-demodulator 36 and the C signal from C-head 22 is applied to the input port of C-demodulator 38.

As the scan progresses, scan track 20a of Y head 20 is over less of Y-track 12a and more over C-track 14a, while scan track 22a of C-head 22 is over less of C-track 14a and more over Y-track 12b. Thus the amplitude of the output signal from demodulator 30 decreases, and the point 42 of tape 10 (which is where the Y and C tracks have equal proportions of scan tracks 20a and 22a), switch 28 switches over to the position shown in dotted lines, and therefore the signal from head 20 is connected to the input port of C-demodulator 38, while the signal from head 22 is connected to the input port of Y-demodulator 36.

As the scan further progresses, scan track 20a is over less of C-track 14a and more of Y-track 12b, while scan track 22a is over less of Y-track 12b and more of C-track 14b. At equal proportion point 44, the output signal from demodulator 30 causes switch 28 to again be in the position shown in solid lines. Thus the signal from Y-head 20 is applied to Y-demodulator 36, while the signal from C-head 22 is applied to C-demodulator 38

It will be seen that signal at the input port of Y-demodulator 36 is almost always a majority Y-signal, while that at the input port of C-demodulator 38 is almost always a majority C-signal. Thus color reproduction and display in the moviola mode is possible.

Figure 3:
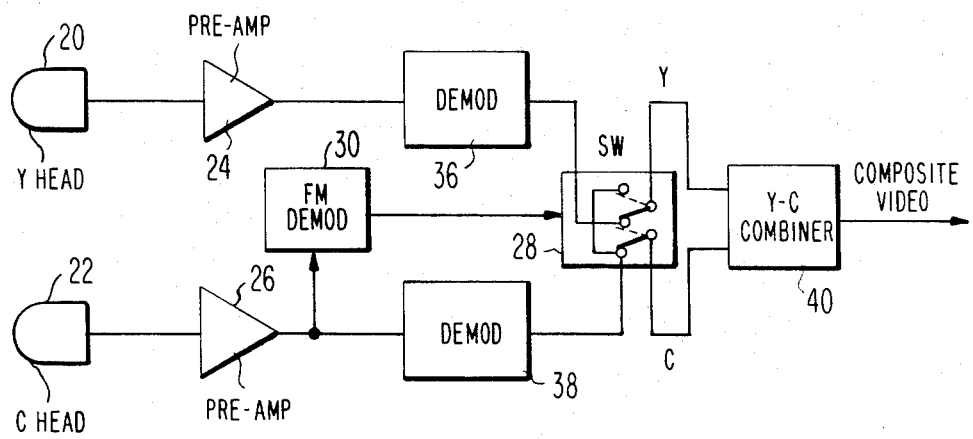
FIG. 3 shows a block diagram of a second embodiment.

FIG. 3 shows a second embodiment of the invention, wherein the same reference numerals are used for corresponding elements and the tape and tape transport are not shown, being the same as shown in FIG. 2. FIG. 3 is used with a tape having the same format as shown in FIG. 1; however the chroma signal comprises a chroma subcarrier modulated by the I and Q signals and having the same deviation as the Y carrier. Thus either demodulator 36 or 38 can demodulate either the Y or C signal. This allows coupling switch 28 to the output ports of demodulators 36 and 38. Operation is otherwise identical to that of FIG. 2.

What is claimed is:

1. A method for reproducing signals from a multitrack tape having recorded thereon at a selected linear tape speed modulated luminance-representative signals on a first track and first and second chrominance representative signals modulated at first and second carrier frequencies, repectively, on a second track, said method comprising:

scanning a pair of transducers across said tape using a linear tape speed different from said selected linear tape speed, whereby each of said transducers scans across a plurality of said tracks and alternately transduces said modulated signals;

coupling the input ports of a pair of demodulators to said pair of transducers and coupling the output ports of said pair of demodulators to utilization means; and switching one of said input ports and said output ports of said pair of demodulators and said transducers cross said tracks in response to detection of the frequency of one of said first and second carriers.

2. A tape playback apparatus for reproducing signals from a multitrack tape having at least first and second modulated signals together representing a color television signal recorded at a selected linear tape speed on at least a pair of respective tracks, at least said second modulated signal being modulated by means of a carrier having an identifiable frequency characteristic, said apparatus comprising;

at least a pair of transducing means adapted to be scanned across said tape using a linear tape speed different from said selected speed where by each of said transducers scans across a plurality of said tracks and alternately transduces said first and second modulated signals;

at least first and second demodulators each having an input port for receiving transduced signals and an output port for producing demodulated signals from said transduced signals;

frequency identification means coupled to at least one of said first and second transducing means for generating a control signal identifying those intervals during which said one of said first and second transducing means is transducing said second modulated signal modulated by means of a carrier having an identifiable frequency characteristic, and switching and coupling means coupled to said tranducing means, to said frequency identification means and to said input and output ports of said first and second demodulators for coupling transduced signals from said transducing means to said input ports and for switching corresponding ones of said input and output ports of said first and second demodulators under the control of said control signal as said transducing means cross said tracks.

3. Apparatus as claimed in claim 2, wherein said first and second modulated signals comprise luminance and chrominance signals of a color video signal.

4. Apparatus as claimed in claim 2, wherein said frequency identification means comprises an FM detector.

5. Apparatus as claimed in claim 2, wherein said demodulators each comprise an FM detector.

6. Apparatus as claimed in claim 2, further comprising combining means coupled to receive said demodulated signals for combining said demodulated signals from said demodulators.

7. Apparatus as claimed in claim 2, wherein said corresponding ports comprise said input ports.

8. Apparatus as claimed in claim 2, wherein said corresponding ports comprise said output ports.

* * * * *

UNITED STATES PATENT AND TRADEMARK OFFICE
CERTIFICATE OF CORRECTION

PATENT NO. : 4,504,869

DATED : March 12, 1985

INVENTOR(S) : Henry Ray Warren

It is certified that error appears in the above-identified patent and that said Letters Patent is hereby corrected as shown below:

Column 3, line 44, Claim 1, "and" should be --as--.

Signed and Sealed this

Twenty-seventh Day of August 1985

[SEAL]

Attest:

DONALD J. QUIGG

Attesting Officer

Acting Commissioner of Patents and Trademarks